United States Patent [19]

Millet et al.

[11] Patent Number: 5,249,730
[45] Date of Patent: Oct. 5, 1993

[54] PROCESS FOR THE MANUFACTURE OF ZIRCONIUM BASED TUBES FORMED FROM LAYERS OF VARYING COMPOSITION

[75] Inventors: Yvon Millet, Beaucouze; Jean Van Wittenberghe, Chalon/Saône, both of France

[73] Assignee: Compagnie Europeenne du Zirconium Cezus, Courbevoie, France

[21] Appl. No.: 26,036

[22] Filed: Mar. 4, 1993

[30] Foreign Application Priority Data

Mar. 4, 1992 [FR] France ................. 92 02799

[51] Int. Cl.$^5$ ............. B23K 20/22; B23K 31/02
[52] U.S. Cl. ..................... 228/131; 228/175; 228/231; 228/262.72; 148/521
[58] Field of Search ........... 228/126, 127, 131, 175, 228/183, 231, 263.21; 148/520, 521

[56] References Cited

U.S. PATENT DOCUMENTS 4,995,548 2/1991 Wang et al. .

FOREIGN PATENT DOCUMENTS

| | | |
|---|---|---|
| 0154931 | 9/1985 | European Pat. Off. . |
| 0326896 | 1/1989 | European Pat. Off. . |
| 2608824 | 8/1976 | Fed. Rep. of Germany . |
| 2624136 | 6/1989 | France . |
| 19456 | 2/1980 | Japan ................. 228/263.21 |
| 2187583 | 8/1987 | Japan ................. 228/263.21 |

*Primary Examiner*—Samuel M. Heinrich
*Attorney, Agent, or Firm*—Dennison, Meserole, Pollack & Scheiner

[57] ABSTRACT

The present invention relates to a process for the manufacture of zirconium based tubes formed from layers of varying composition. The process consists in preparing the tubular blank which is intended to form the outer layer of the tube by rolling-soldering a sheet, and then in fitting it onto another tubular blank, or core block, of smaller diameter, which is obtained by piercing a small bar, and which may be coated on the inside with a plating, in soldering the ends of said blanks in order to subject the assembly to a treatment of placing it in solution in a beta phase, followed by soaking it in water and drawing it. The invention is used for the production of Duplex or Triplex type tubes with an improvement in the gross weight of zirconium needed to make 1000 kg of useful metal, with good adherence being obtained between the layers of said tube.

4 Claims, No Drawings

PROCESS FOR THE MANUFACTURE OF ZIRCONIUM BASED TUBES FORMED FROM LAYERS OF VARYING COMPOSITION

TECHNICAL DOMAIN OF THE INVENTION

The present invention relates to a process for the manufacture of zirconium based tubes formed from layers of varying composition.

Attempts to improve the features of casing materials in the nuclear industry have resulted in new types of products being developed: two layered tubes or Duplex tubes, and three layered tubes or Triplex tubes.

Duplex tubes are formed from a core block of Zircaloy 2 or Zircaloy 4, about 80 to 95% the total thickness of the tube, coated on the outside with a layer of casing of a zirconium alloy which is resistant to corrosion in the nuclear reactor centre where there is boiling water or pressurised water.

In the case of Triplex tubes, the core block with its casing is plated internally with zirconium or another zirconium alloy which is intended to form a barrier to fission products in the fuel and which make the Zircalay core fragile.

Both types of tube are usually called composite Trex tubes.

STATE OF THE ART

French Patent 2624136, corresponding to U.S. Pat. No. 4,981,527 describes a process for the manufacture of Triplex tubes comprising the following stages:

"- preparation of three tubular blanks by hot working and machining in such a way as to have assembly clearances of 0.2 to 0.5 mm between the blanks; The hot working of the blanks which are intended for use as coatings advantageously comprises, subsequent to roughing down, extrusion in the alpha domain of a small pierced bar, or inverse drawing in the alpha domain, the first method being preferred for the non-alloyed Zr blank, and the second being preferred for the blank of greater diameter;
- assembly of three blanks using the electronic bombardment technique;
- soaking the assembly in water after preheating it in the beta temperature range, preferably between 920° and 1050° C.;
- extrusion of the assembly in the alpha domain;
- cold rolling and heat treatment in the intermediate alpha domain and final partial annealing."

PROBLEM POSED

According to the prior art cited hereinabove, it is seen that in order to obtain the blank of greater diameter which will form the casing, inverse drawing is carried out in the alpha domain of a small pierced bar.

Moreover, hitherto all the scales proposed for producing composite tubes involve use of a casing without soldering, in order to guarantee that it is homogeneous in structure.

In fact, it is known that producing edge to edge soldering of two zirconium alloy sheets causes a significant variation in structure between the soldering zone, which, due to the effects of heat, leads to the formation of a beta phase, the zone which is affected thermally by the soldering where the two alpha and beta phases coexist, and the remainder which remains in alpha phase.

Now, this heterogeneous structure inevitably causes variations in thickness to the casing of the finished tube, and consequently differences in behaviour during subsequent deformation and also variable metallurgical features from one end of the tube to the other, resulting in a reduction in resistance of the composite tube thus formed to corrosion in the nuclear reactor centre where there is boiling water or pressurised water.

However, it is seen that the use of rolled sheets can be more worthwhile than the use of small hollow bars would be, since the production of these latter results in the formation in a considerable amount of shavings during the piercing operation, which means that quite a lot of material is lost, the partial recycling costs of which seriously affect the cost price.

STATEMENT OF THE INVENTION

In order to overcome the problems caused by the heterogeneous structure resulting from soldering, and in order to thus make use of the economical advantages of this technique, the Applicant has invented a process for the manufacture of zirconium based tubes formed from layers of varying composition, wherein a tubular blank is prepared which is intended to form the outer layer of the tube or casing and a tubular blank is formed, or core block, of smaller diameter, the inside of which may be coated with a plating, said block being obtained by machining a bar in the form of a small hollow drawn bar, characterised in that the casing is obtained by rolling-soldering of a plate of metal; after being fitted onto the block, the ends of the assembly are then soldered, and then subjected by heating to a treatment wherein they are placed in solution in beta phase, soaked in water and drawn.

Thus, compared with the prior art where the outer blank was obtained by the application of an inverse drawing operation, the invention teaches the use of a process for rolling-soldering a plate of metal.

The plate of metal can be made of any zirconium alloy usually used for the production of composite tube casings.

It can be obtained by known means for the roughcasting of ingots into flat bars, approximately 100 mm in thickness, and hot rolled until a final thickness of close to 10 mm is obtained.

The sheet thus obtained is then rolled and the opposite ends soldered using a known process such as the TIG process or by the use of electronic bombardment. After soldering, the inner surface of the cylinder is machined and the soldering levelled off on the outer generatrix.

Under these conditions, there is a considerable improvement in the gross weight of zirconium needed to make 1000 kg of useful metal.

As with the other processes for the manufacture of composite tubes, the casing is then fitted vertically onto the core block, which may or may not be plated, and the ends of the assembly are then soldered using a soldering process of the known kind, such as electronic bombardment, for example.

Moreover, the rolling-soldering process is combined with a treatment for placement in beta solution by heating to a temperature of between 1020° and 1150° C., followed by soaking in water which allows the beta structure to be made uniform and which consequently allows a homogeneous behaviour to corrosion to be guaranteed for the entire surface area of the outer casing of the tube.

Treatment in beta is carried out for a short period of time, between about 30 and 180 seconds, preferably using an induction heating means to prevent excess increase in size of the beta grain and to minimise oxidation at the surface.

Under these conditions, the hot drawing operation can be carried out without any necessary removal of the oxide layer, this cleaning operation being thus carried out at the end of the hot transformation prior to commencement of the cold transformation.

Then, manufacture is of the conventional kind:
hot drawing at a temperature of between 550° and 750° C., depending on the types of alloys used, into a blank of a given diameter;
possible heat treatment of the blank, either expansion or recrystallisation;
cold Pilger step-by-step rolling;
annealing under vacuum or with neutral gas.

These two latter operations can be repeated once or several times until the desired sizes are obtained.

The product obtained is then conditioned and checked to see that it satisfies product requirements (size requirements in all the components, metallurgical requirements and health requirements).

An inspection carried out either by ultrasound or Foucault currents shows that the component parts of the tube are of uniform thickness and that there are no instances of non-cohesion at the interfaces between the various inner or outer layers.

EXAMPLE OF APPLICATION

The invention can be illustrated with the aid of the following application relating to Triplex tubes;

Manufacture of the outer blank:

using a zirconium alloy containing as its main elements, by weight, 0.5% tin, 0.25% iron and 0.10% chromium, an ingot is cast which was roughcast into a flat bar 100 mm in thickness, then hot rolled until a final thickness of the sheet metal is obtained of 10 mm. The plate of metal was cleaned using mechanical means and then washed.

It was then rolled into a cylinder of external diameter 168 mm and length 430 mm and soldered by electronic bombardment.

The inner surface of the cylinder was then machined until a diameter of 152 mm was obtained, and the soldering was levelled off on the outer generatrix of the cylinder.

Manufacture of a Core Block:

The core block is in the form of a tubular block of Zircalay 2 which is plated internally with zirconium from which hafnium has been removed.

Said block is obtained by working an ingot into bars, and then by working said bars in order to produce a small bar with the following dimensions:
outer diameter: 152 mm,
bore: 79 mm,
length: 430 mm.

This small bar has been plated internally with a casing of zirconium from which hafnium has been removed and which is obtained by drawing a small bar of 168 mm in diameter, with a bore of 48 mm, and length of 450 mm into a tube with an outer diameter of 81 mm and an inner diameter of 47 mm which was then worked into sections with an outer diameter of 78.8 mm, an inner diameter of 48 mm and a length of 430 mm.

The two component parts of Zircalay 2 and zirconium from which hafnium is removed are assembled in the following way:
surface cleaning,
hydrofluoric washing,
placement of the casing made of zirconium from which hafnium is removed over the Zircalay 2 core vertically by gravity,
soldering the two component parts to the two ends by circular soldering by electronic bombardment under vacuum.

Manufacture of the Triplex tube:

The outer casing and the core block have been assembled in the same way as the two component parts of the core block, allowing a clearance, when assembled, which is less than or equal to 0.2 mm.

Then, a placement in solution treatment is carried out at 1100° C. for 60 seconds by heating in an induction oven and by soaking in water.

Then, the assembly was heated to a temperature of 700° C. and drawn to form blank with an outer diameter of 80 mm and a thickness of 17 mm. After thermal expansion treatment and after the surface oxide has been removed, the blank was brought by cold Pilger step-by-step rolling to its final size: outer diameter 63.5 mm; thickness: 10.9 mm and it was then annealed under vacuum at 650° C.

The above example describes a Triplex tube which is intended for boiling water reactors.

The same technique is used for Duplex tubes.

The invention is used for the manufacture of composite tubes where there is a reduction in the gross weight of zirconium needed to make 1000 kg of useful metal, whilst good adherence between the component parts of said tube is obtained.

We claim:

1. A process for the manufacture of zirconium based tubes formed from layers of varying composition wherein a tubular blank is prepared which is intended to form the outer layer of the tube or casing and a tubular blank is formed, or core block, of smaller diameter, which may be coated on the inside thereof with a plating, said block being obtained by machining a bar in the state of a small hollow drawn bar, characterised in that the casing is obtained by rolling-soldering of a plate of metal; after being fitted onto the block, the ends of the assembly are then soldered, and then subjected by heating to a treatment whereby they are placed in solution in beta phase, soaked in water and drawn.

2. A process according to claim 1, characterised in that the duration of the heating operation is between 30 and 180 seconds.

3. A process according to claim 1, characterised in that the heating is carried out in an induction oven.

4. A process according to claim 1, characterised in that the heating temperature is between 1020° and 1150° C.

* * * * *